United States Patent
Baek et al.

(10) Patent No.: US 7,085,096 B2
(45) Date of Patent: Aug. 1, 2006

(54) METHOD OF GENERATING CURRENT TRAJECTORY FOR SEEK CONTROL OF HARD DISC DRIVE AND SEEK CONTROL SYSTEM USING THE SAME

(75) Inventors: Sang-eun Baek, Incheon-si (KR); Chang-ik Kang, Jeju-si (KR)

(73) Assignee: Samsung Electronics Co., Ltd., Gyeonggi do (KR)

( * ) Notice: Subject to any disclaimer, the term of this patent is extended or adjusted under 35 U.S.C. 154(b) by 0 days.

(21) Appl. No.: 10/959,209

(22) Filed: Oct. 7, 2004

(65) Prior Publication Data

US 2005/0078405 A1    Apr. 14, 2005

(30) Foreign Application Priority Data

Oct. 8, 2003    (KR) ............... 10-2003-0070047

(51) Int. Cl.
*G11B 5/596* (2006.01)
(52) U.S. Cl. .................. 360/78.09; 360/78.04
(58) Field of Classification Search ............. 360/78.09
See application file for complete search history.

(56) References Cited

U.S. PATENT DOCUMENTS

| | | | | |
|---|---|---|---|---|
| 6,140,791 A | * | 10/2000 | Zhang | ................. 318/632 |
| 6,594,095 B1 | | 7/2003 | Yamagishi et al. | |
| 2002/0140391 A1 | | 10/2002 | Sakamoto | |

FOREIGN PATENT DOCUMENTS

| | | |
|---|---|---|
| JP | 07311904 | 11/1995 |
| JP | 2001243604 | 9/2001 |
| JP | 2003168268 | 6/2003 |

* cited by examiner

*Primary Examiner*—Wayne Young
*Assistant Examiner*—Jason Olson
(74) *Attorney, Agent, or Firm*—Sughrue Mion, PLLC

(57) ABSTRACT

Provided are a method of generating a current trajectory for seek control of a hard disc drive and a seek control system using the same, the method including setting a current trajectory from harmonics of a sinusoidal wave; calculating a power consumed by a target device to be controlled using the current trajectory; and determining coefficients of the harmonics so as to minimize the power consumed by the device.

9 Claims, 3 Drawing Sheets

METHOD OF GENERATING CURRENT TRAJECTORY FOR SEEK CONTROL OF HARD DISC DRIVE AND SEEK CONTROL SYSTEM USING THE SAME

This application claims the priority of Korean Patent Application No. 2003-70047, filed on Oct. 8, 2003, in the Korean Intellectual Property Office, the disclosure of which is incorporated herein in its entirety by reference.

BACKGROUND OF THE INVENTION

1. Field of the Invention

The present invention relates to a method of generating a current trajectory for seek control of a hard disc drive and a seek control system using the same, and more particularly, to a method of generating a current trajectory by which power is reduced during seek control of a hard disc drive, and a seek control system using the same.

2. Description of the Related Art

In general, a hard disc drive comprises a plurality of magnetic transducers that sense magnetic field of and/or magnetize a single rotating disc or each of a plurality of rotating discs, to write and/or read information to and/or from the disc. The information is typically formatted in a plurality of sectors placed in a ring-shaped track. The tracks are numbered across a surface of the disc. The track numbers being vertically similar to one another are called cylinders. Thus, each track is defined by a cylinder number.

In general, each transducer is integrated to a slider included in a head gimbal assembly (HGA). Each HGA is attached to an actuator. The actuator has a voice coil adjacent to a magnetic assembly, which also specifies a voice coil motor (VCM).

The hard disc drive also comprises a driving circuit for supplying a current to excite the VCM, and a controller. The excited VCM rotates the actuator and moves the magnetic transducers across the surface of the disc(s).

When information is written and/or read into and/or from the disc, the hard disc drive performs a seek routine for moving the magnetic transducers from one cylinder to another cylinder. During the seek routine, the VCM is excited by a current used to move the magnetic transducers to a position of a new cylinder from the surface of the disc. The controller performs a servo routine that guarantees the magnetic transducers to accurately move to a correct position of a cylinder at the center of a track.

Many studies on moving the magnetic transducers to a correct position within the shortest time during the seek routine have been made. However, a serious problem is power consumption of a hard disc drive mounted on a mobile device such as a camcorder or a MP3 player. Since a system in a mobile device is powered by a battery, the power consumption should be as small as possible. The power consumption can be reduced by scheduling operation or stop of a drive by an application program during execution of the application program, by driving a spindle motor, and by appropriately performing a seek control of the VCM.

As described above, the conventional seek control of the VCM has been focused on optimum time control, so as to minimize a track seek time. However, since an acceleration waveform is discontinuous, the optimum time control stimulates a high frequency mode of a mechanical system and increases undesired mechanical noise and vibration. Due to this problem, a seek controller using a soft acceleration waveform of a sinusoidal wave shape, instead of a square wave shape, has been used.

However, a hard disc employed in a mobile device should focus on reducing power consumption rather than on reducing seek time and noise. In particular, during a random file access, the amount of the power consumption during the seek control is not negligible. Accordingly, the hard disc drive used in the mobile device requires a control by which at least required seek time performance is maintained while power consumption is minimized.

SUMMARY OF THE INVENTION

The present invention provides a method of generating a current trajectory by which power consumption of a hard disc drive is minimized, and a seek control system for controlling a voice coil motor (VCM) using the same.

According to an aspect of the present invention, there is provided a method of generating a current trajectory, the method including setting a current trajectory from harmonics of a sinusoidal wave; calculating a power consumed by a target device to be controlled using the current trajectory; and determining coefficients of the harmonics so as to minimize the power consumed by the device.

According to another aspect of the present invention, there is provided a seek control system for driving an actuator in a hard disc drive, the system including a sinusoidal wave generator generating harmonics of a sinusoidal wave having predetermined coefficients; a trajectory generator generating trajectories of a position, a speed, and an acceleration of the actuator from the harmonics, so as to minimize a power consumed by the actuator; and a driving current supplying unit multiplying the position, speed, and acceleration trajectories of the actuator by predetermined coefficients, respectively, adding multiplication results, and outputting the addition results as a driving current for driving the actuator.

BRIEF DESCRIPTION OF THE DRAWINGS

The above aspects and advantages of the present invention will become more apparent by describing in detail an exemplary embodiment thereof with reference to the attached drawings in which.

DETAILED DESCRIPTION OF THE EXEMPLARY EMBODIMENT

Hereinafter, an exemplary embodiment of the present invention will be described in detail with reference to the accompanying drawings.

Figure 1:
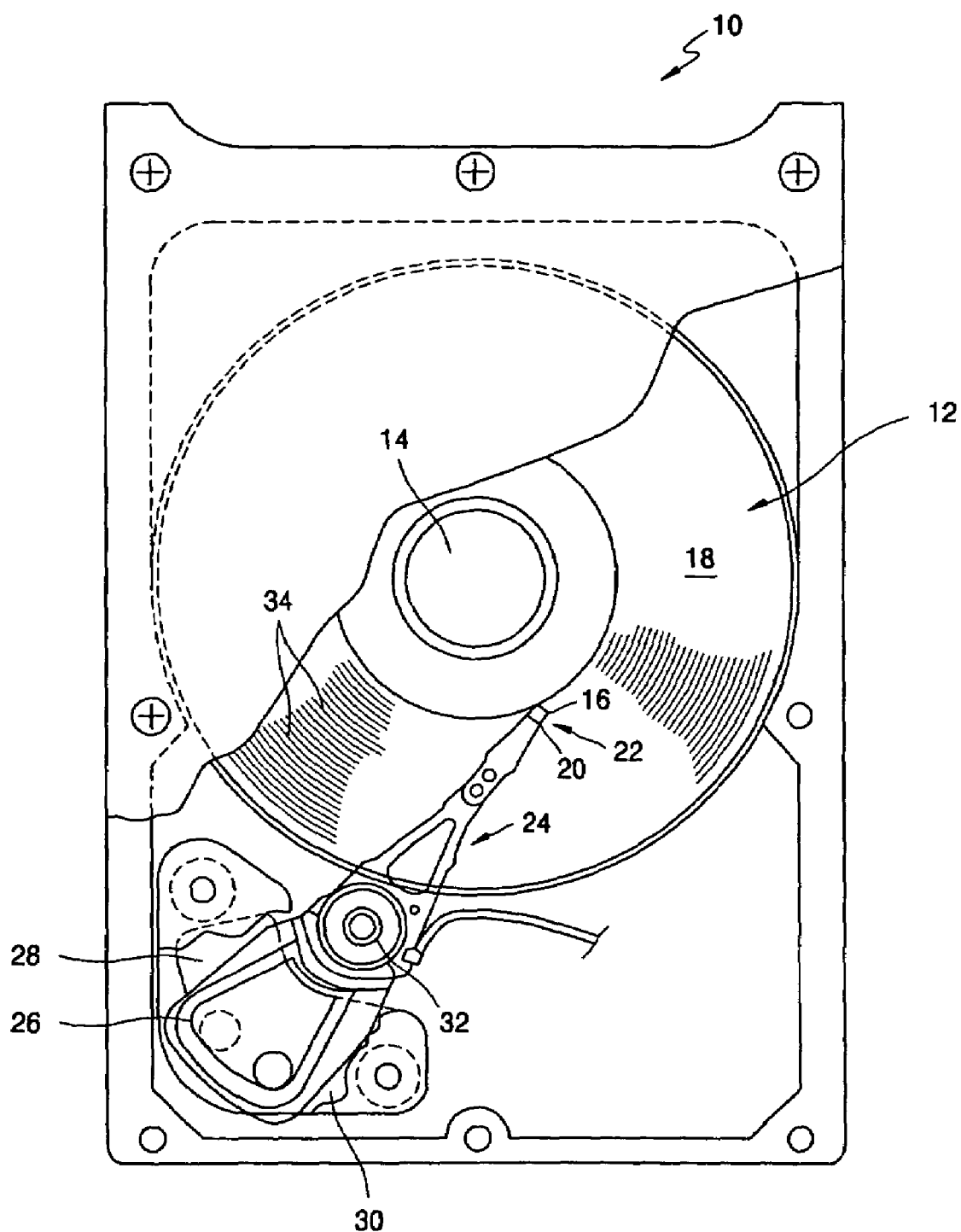
FIG. 1 illustrates a configuration of a hard disc drive.

FIG. 1 illustrates a configuration of a hard disc drive. A hard disc drive 10 shown in FIG. 1 comprises at least one magnetic disc 12 rotated by a spindle motor 14. The hard disc drive 10 further comprises a transducer 16 above a disc surface 18.

The transducer 16 senses a magnetic field of and magnetizes each disc 12 to write and/or read information into and/or from the rotative disc 12. Typically, the transducer 16 is coupled with the disc surface 18. Even though a single transducer 16 is shown, it should be understood that the transducer 16 comprises a writing transducer for magnetizing the disc 12 and a reading transducer for sensing magnetic field of the disc 12. The reading transducer is formed of magneto-resistive (MR) materials.

The transducer 16 can be integrated to a slider 20. The slider 20 has a structure in which an air bearing is generated between the transducer 16 and the disc surface 18. The slider 20 is combined with a head gimbal assembly (HGA) 22. The HGA 22 is attached to an actuator 24 having a voice coil 26. The voice coil 26 of a voice coil motor (VCM) 30 is adjacent to a magnetic assembly 28, which generates movement of the VCM 30. A current supplied to the voice coil 26 generates a torque used to rotate the actuator at a center of a bearing assembly 32. Due to rotation of the actuator 24, the transducer 16 moves across the disc surface 18.

In general, information is stored in a ring-shaped track 34 of the disc 12. In general, each track 34 comprises a plurality of sectors. Each sector comprises a data field and an identification field. The identification field comprises a gray code for identifying a sector and a track (cylinder). The transducer 16 moves across the disc surface 18 to write and/or read information into and/or from another track.

Movements of the actuator 24 and the transducer 16 are performed by a controller (not shown). The controller moves the transducer 16 to a new track from a current track in accordance with a seek routine and a servo control routine. During the seek routine, the controller determines a seek distance between a first track and a second track, adjusts a seek time in response to a speed error between a calculated speed and a designed speed on the seek distance, and controls the actuator 24 to move the transducer 16 to the new track from the current track across the disc surface 18 using an acceleration trajectory.

Equations for the voltage and a motion required for driving the actuator 24 are as follows.

$$L\dot{i} + K_e\dot{x} + Ri = v$$

$$\ddot{x} + B\dot{x} = K_a i \quad (1)$$

Here, v, i, and x are a voltage, a current applied to the VCM 30, and a position of the actuator 24, respectively. Constants L, R, $K_e$, $K_a$, and B are inductance of the VCM 30, a resistance of the VCM 30, a constant on a counter electromotive force generated according to movement of the actuator 24, an acceleration constant, and a friction coefficient of the actuator 24, respectively.

During a seek operation, an averaged input power applied to the actuator 24 by an applied current and voltage is expressed by multiplication of a VCM voltage by a VCM current and is given by Equation 2.

$$P_{in} = \frac{1}{T}\int_0^T vi\,dt \quad (2)$$

$$= \frac{1}{T}\int_0^T (L\dot{i} + K_e\dot{x} + Ri)i\,dt$$

$$= \frac{1}{T}\int_0^T (L\dot{i}i + K_e\dot{x}i + Ri^2)dt$$

Here, a constant T is a seek time.

Since the power consumed by the inductance is 0, the power consumed as heat by the resistance of the voice coil 26 is given by Equation 3.

$$P_R = \frac{R}{T}\int_0^T i^2 dt \quad (3)$$

The mechanical power applied to the actuator 24 is obtained using Equations 1 and 2 below.

$$P_{mech} = \frac{1}{T}\int_0^T K_e \dot{x} i\,dt = \frac{K_e}{TK_a}\int_0^T (\ddot{x}\dot{x} + B\dot{x}^2)dt \quad (4)$$

The power consumption due to mechanical friction of the actuator 24 is obtained using the foregoing Equations below.

$$P_B = \frac{K_e B}{TK_a}\int_0^T \dot{x}^2 dt \quad (5)$$

Thus, the total amount of power consumed is obtained using the foregoing Equations 3 and 5 below.

$$P_{loss} = P_R + P_B = \frac{R}{T}\int_0^T i^2 dt + \frac{K_e B}{TK_a}\int_0^T \dot{x}^2 dt \quad (6)$$

A current trajectory for minimizing the amount of power consumed can be obtained using Equation 6. To this end, the current trajectory is set as Equation 7 from harmonics of a sinusoidal wave.

$$i(t) = I_1 \sin\left(\frac{2\pi}{T}t\right) + I_2 \sin\left(\frac{4\pi}{T}t\right) + \quad (7)$$

$$I_3 \sin\left(\frac{6\pi}{T}t\right) + \cdots + I_N \sin\left(\frac{2N\pi}{T}t\right)$$

Here, current coefficients $I_1, I_2, \ldots, I_N$ are unknown and are selected optimally, so as to minimize power consumption. To minimize power consumption, a friction coefficient of Equation 1 is assumed to be 0, and then an acceleration trajectory corresponding to Equation 7 is given by $K_a i(t)$. In addition, speed and position trajectories are given by integrating and double integrating the acceleration trajectory as follows.

$$\dot{x}(t) = \frac{K_a T}{2\pi}I_1\left[1 - \cos\left(\frac{2\pi}{T}t\right)\right] + \quad (8)$$

$$\frac{K_a T}{4\pi}I_2\left[1 - \cos\left(\frac{4\pi}{T}t\right)\right] + \cdots + \frac{K_a T}{2N\pi}I_N\left[1 - \cos\left(\frac{2N\pi}{T}t\right)\right]$$

$$x(t) = \frac{K_a T}{2\pi}I_1\left[t - \frac{T}{2\pi}\sin\left(\frac{2\pi}{T}t\right)\right] +$$

$$\frac{K_a T}{4\pi}I_2\left[t - \frac{T}{4\pi}\sin\left(\frac{4\pi}{T}t\right)\right] + \cdots +$$

$$\frac{K_a T}{2N\pi}I_N\left[t - \frac{T}{2N\pi}\sin\left(\frac{2N\pi}{T}t\right)\right]$$

Thus, the current coefficients $I_1, I_2, \ldots, I_N$ are given by Equation 9 from a seek distance $X_s$ given by the position trajectory of Equation 8 and a seek time t=T.

$$I_1 + \frac{I_2}{2} + \frac{I_3}{3} + \cdots + \frac{I_N}{N} = \frac{2\pi X_s}{K_a T^2} \qquad (9)$$

In the case of using the current trajectory of Equation 7, the amount of power consumed is given by Equation 10.

$$P_{loss} = \left(\frac{R}{2T} + \frac{3T^2 K_a K_e B}{8\pi^2}\right) I_1^2 + \left(\frac{R}{2T} + \frac{3T^2 K_a K_e B}{32\pi^2}\right) I_3^2 + \cdots + \qquad (10)$$
$$\left(\frac{R}{2T} + \frac{3T^2 K_a K_e B}{8N^2\pi^2}\right) I_N^2$$

Thus, the problem of minimizing the power consumption comes to one of minimizing $J(Y)=Y^T QY$, for a matrix equation AY=b. Here, the square matrix Q, vector Y, vector A, and constant b are obtained using Equation 11.

$$Y = [I_1 \quad I_2 \quad I_3 \quad \cdots \quad I_N]^T \qquad (11)$$

$$Q = \begin{bmatrix} \frac{R}{2T} + \frac{3T^2 K_a K_e B}{8\pi^2} & 0 & \cdots & 0 \\ 0 & \frac{R}{2T} + \frac{3T^2 K_a K_e B}{32\pi^2} & \cdots & 0 \\ \vdots & \vdots & \ddots & \vdots \\ 0 & 0 & \cdots & \frac{R}{2T} + \frac{3T^2 K_a K_e B}{8N^2\pi^2} \end{bmatrix}$$

$$A = \begin{bmatrix} 1 & \frac{1}{2} & \frac{1}{3} & \cdots & \frac{1}{N} \end{bmatrix}$$

$$b = \frac{2\pi X_s}{K_a T^2}$$

Thus, a solution Y of the optimization problem, that is, the harmonic coefficients of the current trajectory are determined by Equation 12 in accordance with Ricatti Equation.

$$Y = Q^{-1}A^T(AQ^{-1}A^T)^{-1}b \qquad (12)$$

Figure 2:
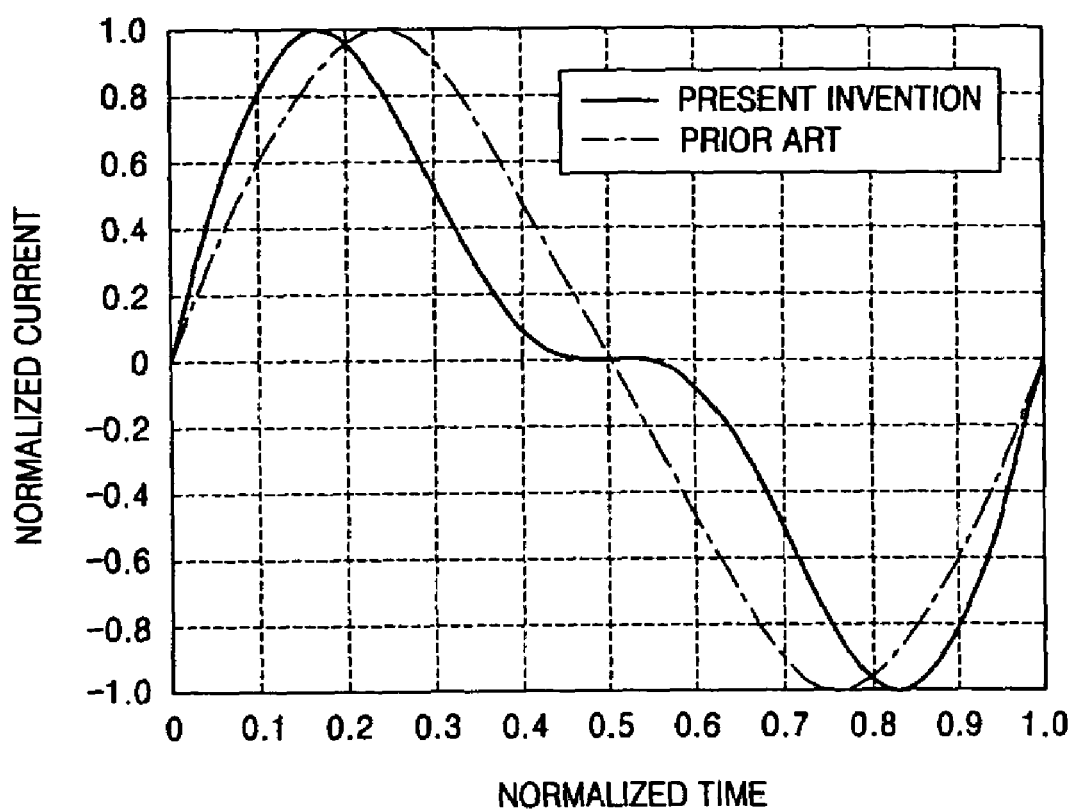
FIG. 2 shows a conventional sinusoidal wave current trajectory and a current trajectory generated according to an exemplary embodiment of the present invention.

Thus, when the friction coefficient B=0 and it is considered up to a secondary harmonic wave of the current trajectory, namely, $$i(t) = I_1 \sin\left(\frac{2\pi}{T}t\right) + I_2 \sin\left(\frac{4\pi}{T}t\right),$$

the current trajectory for minimizing power consumption is given by a waveform shown in FIG. 2. FIG. 2 shows a conventional sinusoidal wave current trajectory and a current trajectory generated according to an exemplary embodiment of the present invention. Referring to FIG. 2, the actuator 24 according to a control of the present invention reaches a peak value in a shorter time than in the prior art, and after reaching the peak value, the actuator 24 moves slow. The power consumed when the actuator 24 moves on the current trajectory according to the present invention is reduced by about 20% compared to the amount of power consumed when the actuator 24 moves on the conventional sinusoidal wave current trajectory.

Figure 3:
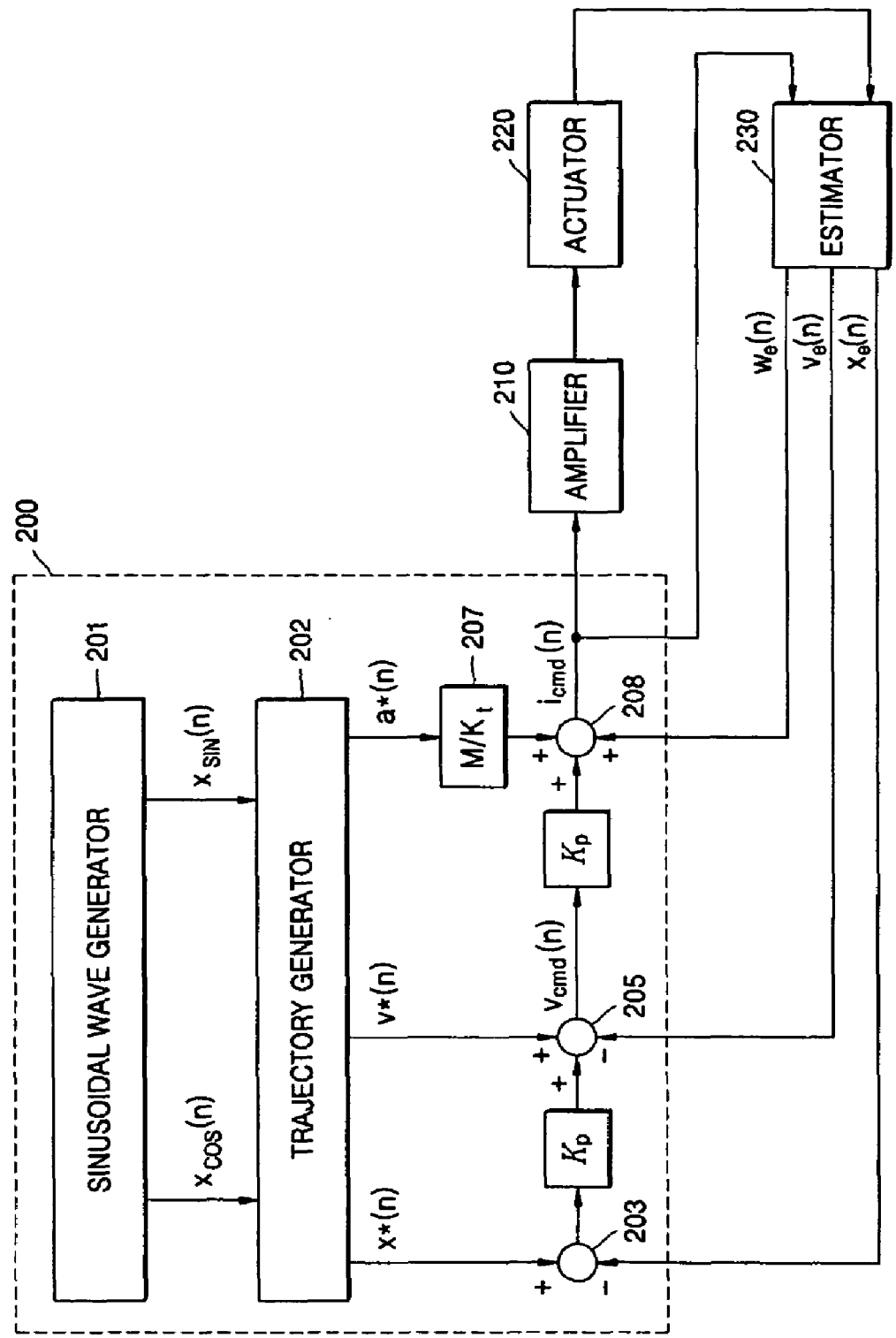
FIG. 3 is a block diagram of a seek control system according to an exemplary embodiment of the present invention.

FIG. 3 is a block diagram of a seek control system according to the present invention. The seek control system shown in FIG. 3 comprises a current generator 200, an amplifier 210, and an actuator 220. The seek control system further comprises an estimator 230 which estimates the position, speed, and acceleration of the actuator 220 from position information output from the actuator 220.

The current generator 200 generates a current for driving the actuator 220, and the amplifier 210 amplifies the current generated by the current generator 200. The actuator 220 is driven by the current amplified by the amplifier 210 and moves the transducer 16 of FIG. 1 to a desired position. The estimator 230 estimates the current position $x_e(n)$ of the actuator 220, speed $v_e(n)$, and acceleration $w_e(n)$ from the position information output from the actuator 220 and feeds back the estimated values to the current generator 200.

The current generator 200 comprises a sinusoidal wave generator 201, a trajectory generator 202, a first adder 203, a first coefficient multiplier 204, a second adder 205, a second coefficient multiplier 206, a third coefficient multiplier 207, and a third adder 208.

The sinusoidal wave generator 201 generates harmonics of a sinusoidal wave, as defined as Equation 7. The coefficients of the harmonic waves are determined by Equation 12. The trajectory generator 202 generates trajectories of current position x*(n), speed v*(n), and acceleration w*(n), which are given by Equation 8, from the generated harmonics.

The first adder 203 subtracts an estimated position fed back from the estimator 230 from a position generated by the trajectory generator 202. The first coefficient multiplier 204 multiplies an output of the first adder 203 by a first coefficient $K_p$. The second adder 205 adds speed output by the first coefficient multiplier 204 to speed output by the trajectory generator 202, subtracts an estimated speed fed back from the estimator 230 from the added speed, and outputs a voltage $V_{cmd}(n)$. The second coefficient multiplier 206 multiplies an output of the second adder 205 by a second coefficient. The third coefficient multiplier 207 multiplies an acceleration trajectory output from the trajectory generator 202 by a third coefficient $M/K_t$. The third adder 208 adds outputs of the second and third coefficient multipliers 206 and 207 to the estimated acceleration fed back from the estimator 230 and outputs a current $i_{cmd}(n)$ for driving the actuator 220.

Voltage and current trajectories output from the second adder 205 and the third adder 208, respectively, are given by Equation 13.

$$v_{cmd}(n) = K_p[x^*(n) - x_e(n)] + v^*(n) \qquad (13)$$

$$i_{cmd}(n) = K_v[v_{cmd}(n) - v_e(n)] + \frac{M}{K_t}a^*(n) + w_e(n)$$

The seek control system drives the actuator 220 while controlling the actuator 220 in a feed-forward type according to the voltage and current trajectories given by Equation 13.

As described above, a current trajectory is generated so as to minimize power consumption during a seek control of a hard disc employed in a mobile device. Therefore, the actuator can be driven with the power consumed during an identical time period more reduced.

While the present invention has been particularly shown and described with reference to exemplary embodiments thereof, it will be understood by those skilled in the art that various changes in form and details may be made therein without departing from the spirit and scope of the invention as defined by the following claims.

What is claimed is:

1. A method of generating a current trajectory, the method comprising:

setting a current trajectory from harmonics of a sinusoidal wave;

calculating a power consumed by a target device to be controlled using the current trajectory; and determining coefficients of the harmonics so as to minimize the power consumed by the device.

2. The method of claim 1, wherein the target device is an actuator driven by a voice coil motor in a hard disc drive.

3. The method of claim 1, wherein the power consumed in the actuator is power consumed as heat by a resistance of the voice coil motor and power consumed by mechanical friction of the actuator.

4. The method of claim 3, wherein the determining comprises:

obtaining a position, a speed, and an acceleration of the actuator according to the current trajectory and motion equations of the actuator;

obtaining power consumed according to the current trajectory for a predetermined seek distance and seek time; and obtaining coefficients of the current trajectory using a predetermined optimization method of minimizing the power consumed.

5. A seek control system for driving an actuator in a hard disc drive, the system comprising:

a sinusoidal wave generator generating harmonics of a sinusoidal wave having predetermined coefficients;

a trajectory generator generating trajectories of a position, a speed, and an acceleration of the actuator from the harmonics, so as to minimize a power consumed by the actuator; and a driving current supplying unit multiplying the position, speed, and acceleration trajectories of the actuator by predetermined coefficients, respectively, adding multiplication results, and outputting the addition results as a driving current for driving the actuator.

6. The system of claim 5, further comprising an estimator estimating a current position, a speed, and an acceleration of the actuator from an output of the actuator and outputting estimated values to the driving current supplying unit.

7. The system of claim 6, wherein the driving current supplying unit adds the estimated position, speed, and acceleration of the actuator to a position, a speed, and an acceleration output from the trajectory generator, respectively.

8. The system of claim 5, wherein the trajectory generator determines a current trajectory, so as to minimize power consumed by the actuator and outputs the position, speed, and acceleration trajectories according to the determined current trajectory according to motion equations of the actuator.

9. The system of claim 8, wherein the trajectory generator determines the current trajectory using a predetermined optimization method, so as to minimize power consumed by the actuator when a motion friction coefficient of the actuator is set to 0.

* * * * *